July 5, 1955   I. B. LUECK   2,712,180
MULTIFOCAL LENS MARKING DEVICE
Filed Sept. 13, 1952   2 Sheets-Sheet 1

INVENTOR.
IRVING B. LUECK
BY
ATTORNEY

July 5, 1955
I. B. LUECK
2,712,180
MULTIFOCAL LENS MARKING DEVICE
Filed Sept. 13, 1952
2 Sheets-Sheet 2
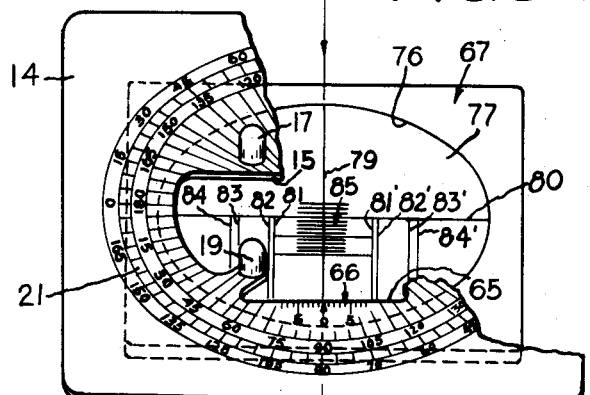
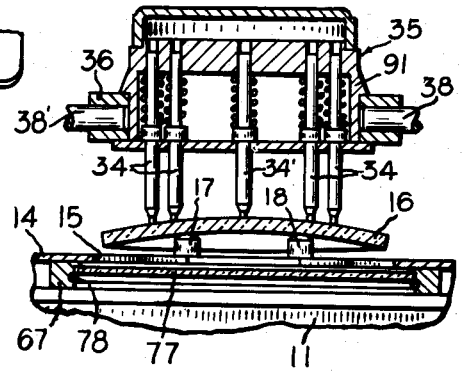
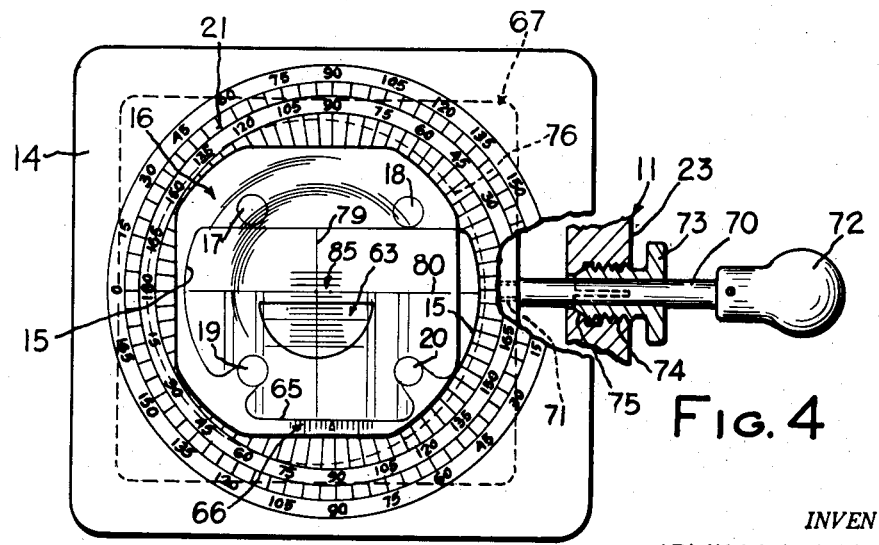
INVENTOR.
IRVING B. LUECK
BY
ATTORNEY United States Patent Office 2,712,180
Patented July 5, 1955

2,712,180

MULTIFOCAL LENS MARKING DEVICE

Irving B. Lueck, Perinton, N. Y., assignor to Bausch & Lomb Optical Company, Rochester, N. Y., a corporation of New York Application September 13, 1952, Serial No. 309,423

5 Claims. (Cl. 33—174)

This invention relates to improvements in devices for marking indicia on multifocal ophthalmic lens blanks according to prescribed specifications.

Heretofore, makers of devices of this sort have usually employed complex and expensive mechanisms in an effort to produce an accurate and reliable machine. In some cases, a simplified mechanism was employed, but inferior work resulted. Further, the number and kind of operations that could be performed on the simplified machines were quite limited.

It is an object of this invention to provide a multifocal lens marking machine that employs simple and relatively inexpensive mechanisms to produce accurate and reliable results. Another object is to produce a simplified machine that is capable of carrying on the same number and kind of operations performed by prior complex machines.

These and other objects and advantages will be found in the novel details of construction and combination of parts as described in the following specification and shown in the accompanying drawing in which:

Fig. 3 is a semi-schematic view of certain operating parts that illustrate the relationship between the protractor and the scaled mirror.

Fig. 4 is a view taken on the line 4—4 of Fig. 1 looking in the direction of the arrows.

Fig. 5 is a view on the line 5—5 of Fig. 1 looking in the direction of the arrows.

Figure 1:
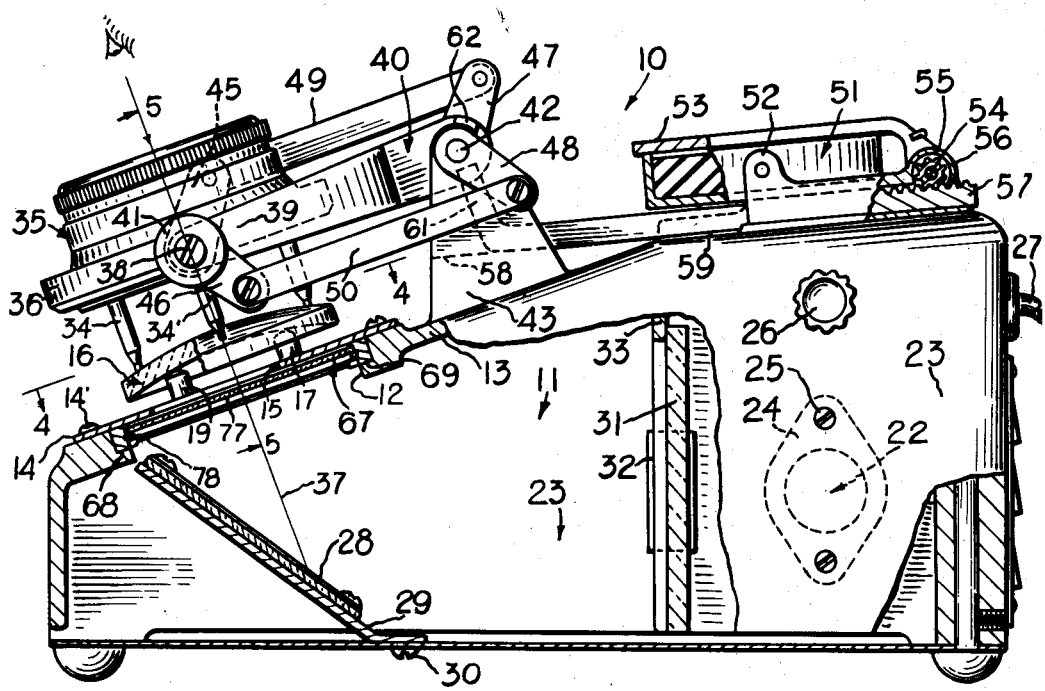
Fig. 1 is a side elevational view, with some parts broken away and shown in section, of a preferred form of this invention.
Figure 2:
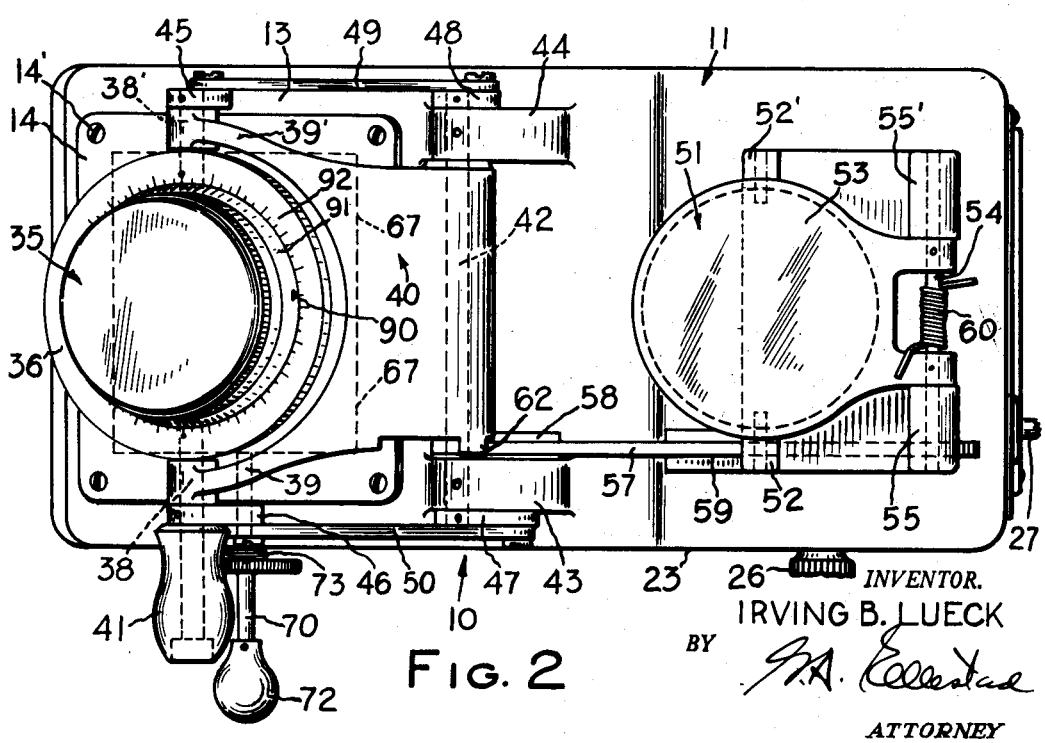
Fig. 2 is a top plan view of the structure shown in Fig. 1.

With reference to Fig. 1 of the drawings, a lens marking machine is shown at 10 comprising a hollow frame or housing 11 which is provided with an opening or aperture 12 in its top wall 13. A flat plate 14 is secured over the opening 12 by several screws 14' which extend through holes in the plate and are threaded into the frame 11. An aperture 15 is formed in the plate in axial alignment with the opening 12. A mechanism for supporting a multifocal ophthalmic lens blank 16 during the marking process consists of four posts or fingers 17, 18, 19, 20 of equal height which are fixed at the bottom ends, in any preferred manner such as riveting, to the plate 14 around the aperture 15 so that the lens blank 16 may be transilluminated by light projected from below as hereinafter described. Around the aperture 15, a double protractor 21 is provided to extend the use of the instrument as will be more fully described. A lamp 22 is installed on a side wall 23 in the frame 11 by means of a lamp socket 24 which is attached to the frame by screws 25. Suitable connections, including a switch 26 and an electric cable 27, are provided for energizing the lamp 22 from an electrical power circuit. Beneath the lens blank 16 in the frame 11, is located a plane mirror 28 which is held in an oblique or inclined position by a mirror mounting 29 so that light from the lamp 22 is directed upwardly through the aperture 15 to illuminate said lens blank. Screws 30 are threaded through the frame 11 into the mounting 29 to hold it in oblique position as shown in Fig. 1. Between the mirror 28 and lamp 22, is vertically mounted a glass window 31. Preferably, the window 31 is made of light filtering or diffusing glass and is releasably secured by any means such as the clips 32 to a transverse ledge 33 which is integral with the inner part of the frame 11. The window 31 may be tinted green, or any other color. This tinting has a tendency to soften the harshness of the diffused light reflected through the lenses being marked.

For the purpose of marking the lens blank 16 with the prescribed indicia, several marking styli 34, 34' are spring mounted in a protractor head 35 which is located in a carrier ring 36, the center stylus 34' being located on the sighting axis 37 of the instrument. The protractor head 35 has a pointer 90 mounted on the rotatable head 91. A scale 92 is laid out in degrees on the upper face of ring 36 in alignment with pointer 90. The styli 34, 34' are mounted in the head 91 so as to rotate therewith. Five, seven or nine styli 34, 34' are mounted in a row and will extend horizontally across the head 91 when the pointer 90 indicates a zero reading on scale 36. Other styli 34 are placed around the face of the head 91. In practice, it has been found that a lens marked with only a few points may become useless under certain setup conditions. For instance, suppose that a blank has been marked with only three marks to indicate an axis. In order to avoid prism in the lens due to off-center grinding, a portion of the blank is crumbled off. In this crumbling some of the marks will be broken off and hence a good reference line is no longer available for use in setting the blank for polishing. However, by using five, seven, or nine marks in a row, there are always some marks left for ready reference in setting up the blank for polishing.

A predetermined angle is set up between the major axis and the segment 63 by rotating head 91 until pointer 90 indicates the desired angle on scale 92. When the styli 34, 34' are brought into contact with a positioned lens, the angle so laid out will be marked thereon.

The ring 36 is held on aligned pivot pins 38 and 38' which are journaled in the opposite arms 39, 39' of a yoke 40. A handle 41 is secured on the outer end of the pin 38 for use by the operator in lifting the head 35. The head 35 may be moved in an arc around a pivot rod 42 on which the lower end of the yoke 40 turns, said rod being fixed in a pair of upstanding bosses 43 and 44 which are a part of the frame 11. In order to maintain the head 35 in the same tilted position with respect to the frame 11 while the yoke 40 is swung about rod 42, a parallelogram linkage is provided comprising the arms 45, 46 and 47, 48 which are fixed, respectively, to the pivot pins 38, 38' and the pivot rod 42. Rigid links 49, 50 interconnect, respectively, the arms 45 and 47 and arms 46 and 48.

An inkwell 51, supported on lugs 52, 52' which are integral with the frame 11, is provided for inking the styli 34, 34' at the termination of the back swing of the yoke 40. To keep out foreign matter during periods of non-use, a cover 53 is hinged over the inkwell 51 on a cross-shaft 54 which is suitably fixed to the cover and is rotatably journaled in a second pair of upstanding lugs 55, 55' on the frame 11. The cover 53 is automatically moved to uncover the inkwell 51 as the head 35 is moved into inking position by an actuating mechanism including a pinion 56 suitably fixed to the outer end of shaft 54 to which the cover is secured. Pinion 56 is rotated by a rackbar 57 in mesh therewith, the rackbar being arranged to slide horizontally in aligned slideways 58 and 59 formed, respectively, in the bosses 43 and 52. Adjacent the slideway 58, the rackbar 57 is provided with an upstanding endpiece 61 which terminates closely adjacent to the pivot rod 42 within the radius of rotation of a sidewardly projecting lug 62 on the yoke 40 so that the lug engages the endpiece to move the rackbar as the yoke is rotated. A torsion spring 60 is mounted in loaded condition on the shaft 54 with the opposite ends of the spring bearing against the cover 53 and frame 11, respectively.

Underneath the plate 14 is located a slide 67 which fits into a pair of parallel slideways 68 and 69 formed in the frame 11 and movable along the slideways by a stem 70. The stem 70 which is secured to the slide 67 in any desired manner such as threading 71, projects through a hole in the side 23 of the frame 11, and has a knob 72 mounted on its outer end. A collet type bushing 73 is placed on the stem 70 and threaded at 74 for movement against a tapered seat 75 in the frame 11 for locking the stem in a set position. At the center of the slide 67 there is provided an opening 76 considerably larger than the aperture 15. Across the opening is secured a transparent gauge plate 77, made of glass, plastic, or other suitable material, which is held in secured position in the slide 67 by any preferred means such as the retaining ring 78.

The forward part of aperture 15 is provided with a straight horizontal edge 65 along which is engraved or printed spaced indicia 66, called the outset and inset scale. The spaced indicia has a zero mark at its midpoint in horizontal alignment with the center stylus 34′ and the sighting axis 37. The calibrations on the front face of the gauge plate 77 include a vertical centerline 79 perpendicular to a horizontal centerline 80. The vertical centerline 79 is aligned with the spaced indicia 66 and is perpendicular to the edge 65. Symmetrical with the centerline 79 and parallel thereto are pairs of segment centering lines 81, 81′; 82, 82′; 83, 83′; and 84, 84′, each pair having a mutual separation corresponding to a different width of lens segment 63. The term "width" designates the horizontal dimension of the segment. Along the vertical centerline 79 is formed a vertical scale 85 having a zero mark position at the horizontal centerline 80 for the purpose of setting the height of the segment a prescribed distance above or below the horizontal centerline 80 of the blank 16. This setting is sometimes referred to in the art as the "drop" of the segment.

To avoid parallax errors in setting the segment 63 for prescribed amounts of inset or outset and drop, calibrations 86 are formed on the mirror 28 for use with the spaced indicia 66. The calibrations 86 are laid out along a horizontal centerline 87 on the mirror. Vertical centerline 95 forms the zero point for calibrations 86. When the centerline 79 of the gauge 77 aligns with the proper value on indicia 66 and both align with the same value on calibrations 86, a lens segment may be centered for proper inset or outset over the gauge without errors due to parallax. To avoid parallax in setting the segment 63 for the height or drop of the segment, the horizontal centerlines are used. When line 87 on the mirror coincides with line 80 on the gauge 77, the top of a segment aligned with the predetermined horizontal line 85 is also without parallax error.

In the operation of this machine, the protractor head 91 is rotated until pointer 90 indicates the desired predetermined angle on scale 92. This is the angle the major axis will have with respect to the lens segment. The head 35 is then swung backward into inking position. Before it reaches this position, the lug 62 on the yoke 40 engages the endpiece 61 to draw the rackbar 57 forward and open the inkwell cover 53. The marking styli 34, 34′ will stand on the inkpad 51. After releasing the lock bushing 73, the gauge 77 is then moved laterally to align its centerline 79 with a selected indicium 66 according to the prescribed value of outset or inset of the segment with respect to the geometric center of the lens. The lens blank 16 is placed on the supporting posts 17, 18, 19 and 20. With the lamp 22 energized, light is diffused through the glass window 31 and is reflected onto the lens blank from below by the mirror 28. Due to the nature of diffused light, the outline of the segment 63 is clearly visible. The blank 16 is moved horizontally until the segment 63 is centered between a pair of vertical centering lines 81, 81′, for instance. This is the inset or outset setting for the segment of the blank. While maintaining this horizontal setting of the segment 63, the lens blank is moved until the top of the segment aligns with the specified setting on the vertical scale 85 for the height or drop of the segment. While setting the inset and drop, the horizontal centerlines 80 and 87 must be superimposed on one another to avoid horizontal parallax. The vertical centerline 79 must be aligned with the proper corresponding values of indicia 66 and calibrations 86 to avoid vertical parallax. Holding the lens blank in the adjusted position with the left hand, the operator swings the protractor head 35 forwardly with the right hand until the styli 34, 34′ mark the face of the blank with the prescribed preset major axis.

In the event the inking head 35 should be out of use temporarily or in case the operator so desires, an alternative major axis layout device is provided in the form of protractors 21. After the lens segment has been properly positioned over gauge 77, a rule or other straight edge is positioned between the appropriate major axis readings on the protractor and a major axis can be drawn across the face of the lens along the edge of the rule.

From the foregoing, it will be evident that there is provided a lens marking machine in which the various lens constructions such as segment outset or inset, as well as height of segment or drop, calipering points and cylinder axis may all be correctly adjusted in the machine before the lens is marked in conformity with the objects of this invention. Although one preferred form of this invention has been shown and described in detail, other forms are possible, and changes may be made in the arrangement and construction of its parts and substitutions may be made therein without departing from the spirit of the invention as defined in the appended claims.

I claim:

1. In a multifocal lens marking device having a housing with an opening in the top thereof, means for supporting a lens over the opening, a lens marking device mounted on the housing, and a source of diffused light in the housing, the combination of indicia carried at one edge of the opening, a transparent gauge plate mounted in the housing below the opening, a mirror mounted below the gauge plate in optical alignment with the light source, said gauge plate and mirror each having calibrations in optical alignment along a line perpendicular to the gauge plate, said gauge plate being movable to selectively align the calibrations on the gauge plate with the spaced indicia carried at the edge of the opening whereby a multifocal lens supported over the opening may be aligned with preselected calibrations on the gauge plate and marked with the marking device.

2. In a machine for marking a segmented lens blank, a frame having an opening in the top thereof, means for supporting a lens over the opening, a lens marking tool on the frame and a source of diffused light within the frame, the combination of a mirror disposed in the frame between the light source and the opening, a slidable transparent gauge plate disposed between the mirror and the opening, scale means on the mirror and on the gauge plate in optical alignment with each other along a line perpendicular to the gauge plate whereby a segmented lens blank may be positioned over the opening with the segment in alignment with a preselected setting of the gauge plate to permit proper marking of the lens blank.

3. A device for marking indicia on a multifocal lens blank comprising a frame having an opening over which a lens to be marked is positioned, a source of diffused light within the frame, spaced indicia on the edge of the opening, a laterally slidable transparent gauge plate disposed below the opening and having horizontal and vertical centerlines thereon, means for moving the gauge plate to align the vertical centerline with the indicia on the edge of the opening, a plurality of evenly spaced horizontal lines on the gauge plate disposed normal to the vertical centerline, a plurality of vertical lines on the gauge plate spaced on both sides of the vertical centerline, and a mirror in the frame having horizontal and vertical centerlines in optical alignment with the gauge plate, the horizontal centerlines of the gauge plate and mirror coinciding along a line perpendicular to the gauge plate.

4. In a multifocal lens blank marking mechanism comprising a frame, supporting members for the lens blank mounted around an opening in the top of the frame, and a source of diffused light in the frame for illuminating the lens blank, the combination of spaced indicia on one edge of the opening, a transparent gauge plate disposed below the opening and having horizontal and vertical centerlines thereon, means for moving the gauge plate to align the vertical centerline with one of said spaced indicia, segment positioning calibrations on the gauge plate normal to the centerlines for use in positioning a lens segment according to a predetermined value, a mirror in the frame having horizontal and vertical centerlines in optical alignment with the horizontal and vertical centerlines on the gauge plate in one position of the gauge plate along a line of sight perpendicular to the gauge plate, so that when an illuminated lens blank is positioned over a predetermined calibration on the gauge plate along the perpendicular line of sight, a predetermined axis may be marked thereon in proper relationship to the segment.

5. In a multifocal lens marking mechanism having a housing with an opening in the top thereof, lens supporting means adjacent the opening, and a source of diffused light in the housing, the combination of a transparent gauge plate slidably mounted on the housing over the opening, calibrations on said plate including horizontal and vertical centerlines, a plurality of equally spaced lines disposed normal to the vertical centerline for vertical positioning of a lens segment, a plurality of spaced vertical lines located on each side of the vertical centerline for horizontal positioning of the lens segment, spaced indicia on the housing along the edge of the opening, means for moving the gauge plate from side to side to align the vertical centerline with one of said spaced indicium on the edge of the opening, a mirror mounted in the housing below the gauge plate and in optical alignment with the source of light, calibrations on the mirror including horizontal and vertical centerlines, the calibrations on the gauge plate and mirror being in aligned relation along a sight line perpendicular to the gauge plate whereby a lens positioned over the gauge plate with the lens segment between the proper vertical lines and aligned with the proper horizontal line can be marked with a predetermined axis relative to said segment.

References Cited in the file of this patent

UNITED STATES PATENTS

| | | |
|---|---|---|
| 1,528,138 | Watson | Mar. 3, 1925 |
| 2,191,107 | Glancy | Feb. 20, 1940 |
| 2,290,566 | Lockhart | July 21, 1942 |
| 2,348,858 | Sheehy | May 16, 1944 |
| 2,582,048 | Line | Jan. 8, 1952 |
| 2,603,000 | Lanman | July 15, 1952 |